United States Patent [19]

Schlatter

[11] 4,256,055
[45] Mar. 17, 1981

[54] MILK VALVE COVER GUARD

[76] Inventor: Ralph L. Schlatter, Rte. 3, Box 2008, Paulding, Ohio 45879

[21] Appl. No.: 75,507

[22] Filed: Sep. 13, 1979

[51] Int. Cl.³ .............................................. A01K 1/12
[52] U.S. Cl. ................................. 119/14.03; 137/381
[58] Field of Search ....................... 119/14.01, 14.03; 137/377, 381, 382

[56] References Cited
U.S. PATENT DOCUMENTS

| 2,585,694 | 2/1952 | Sisson | 137/381 |
| 2,600,187 | 6/1952 | Bart | 137/381 |
| 2,793,612 | 5/1957 | Babson | 119/14.03 |

Primary Examiner—Hugh R. Chamblee
Attorney, Agent, or Firm—Harvey B. Jacobson

[57] ABSTRACT

The guard comprising a curved housing fixedly mounted to the concrete curb of a tie stall or comfort stall barn overlying the mild valve on a low line installation in such a barn. The guard has a hinged cover which can be opened to provide access to the milk valve and can be swung to a closed position when the valve is not in use. The guard protects the milk valve from possible damage which could be caused by cows hoofs contacting the valve and also inhibits contamination from hay, other feed and bedding materials which might otherwise contact the valve.

4 Claims, 4 Drawing Figures

MILK VALVE COVER GUARD

BACKGROUND OF THE INVENTION

1. Field of the Invention

This invention relates to milk line systems and especially to protective guards for isolating milk valves from contamination by their surroundings.

2. Discussion of Related Art

Low pipeline installations have become popular in elevated milking parlors for some time, but are a new idea in born tie stall. The purpose of installing the pipeline at a low level is to prevent vacuum fluctuations at the teat end. When there is excessive fluctuation at the teat end, the cow is more susceptible to infections of mastitis due to tissue damage.

Pipelines in tie stall barns have traditionally been high line installations having a height of from five to seven feet or higher. Installations such as these can cause severe fluctuations on the column as milk drops back in the milk hose between pulsations.

Many valves for use in milk lines have been suggested. However, none provides adequate protection from contamination or damage when used in a low line installation. For instance, U.S. Pat. No. 3,967,810, issued July 6, 1976, to Pulvermacher, shows a pipeline inlet valve having a valve housing to receive an inlet pipe. A spring biased cover moves under force of a spring to a closed position to seal the inlet pipe opening when not in use. The cover also carries a neoprene rubber seal to seal the opening. When the inlet pipe is inserted in place, the cover is displaced and a concave recess in the covering engages the inlet pipe and secures the pipe in place and provides a fluid seal. U.S. Pat. No. 3,480,252, issued Nov. 25, 1969, to Simons, shows a pipeline milking system which includes a valve body mounted on a pipeline and having an opening in alignment with an opening in the pipeline. The opening in the valve body is enclosed by a hinged lid. U.S. Pat. No. 3,055,385, issued Sept. 25, 1962, to Tieken, shows a milk pipeline valve having a nipple at a valve with a member carried in the nipple between the nipple ends. A removable closure has a position in sealed engagement with the open end of the nipple and a recessed guard for the closure is carried by a strap surrounding the nipple. The closure is mounted on the strap by a spring connected therebetween. The closure is movable between a position in sealed engagement with the open end of the nipple and a position with the sealing surface received in the recess of the guard. U.S. Pat. No. 3,872,882, issued Mar. 25, 1975, to Fjermestad et al, shows a milk line nipple protector having a flexible resilient sleeve member with transverse corrugations secured to the milk line nipple at its inner end and in telescoping encasing relationship and having a rigid ring member at its outer end mounted in sliding relation to the nipple. The sleeve is compressible relative to the nipple to permit ready attachment of the milking machine connector to the nipple and automatically returns to contamination protective encasing relation to the nipple upon withdrawal of the milking machine connector.

SUMMARY OF THE INVENTION

One object of the present invention is to provide a milk valve cover guard which can be used with presently available milk valves in a low line installation to protect the milk valves from contamination or damage due to their vulnerable position within the animal stall.

A further object of the present invention is to provide a milk valve cover guard which provides a barrier to contamination and damage which barrier is spaced from its associated valve in order that any contamination accumulating on the guard will not be capable of contacting the valve.

Yet another object of the present invention is to provide a milk valve cover guard which can be permanently secured to the curb of a manger area in a tie barn in order to provide adequate structural rigidity to the guard.

A further object of the present invention is to provide a milk valve cover guard which provides adequate drainage for cleaning fluids applied to the valve.

Still another object of the present invention is to provide a milk valve cover guard which is simple in construction and easily installed over a milk valve.

In accordance with the above objects, the milk valve cover guard of the present invention comprises a housing having a vertical section and a horizontal section. The vertical section includes a channel member having apertures formed therein for bolting the housing to a vertical side of a curb in a manger area. A pair of side panels are attached to the legs of the channel member. The side panels extend upwardly past the position of the channel member and curve to a horizontal position for connection to the top of the curb in the manger area. The outer edge of the channel members are connected by a sheet metal covering which is open across one section to allow access to the milk valve being enclosed by the guard. A hinged cover is mounted over the opening and has an overlapping flap which engages a lower portion of the sheet metal covering. The entire guard can be affixed to the concrete curb in a position overlying a milk valve and the cover can be closed to provide secure, contamination-free protection for the milk valve. The bottom of the guard extends to a position just above the floor and is left open in order that the valve can be washed and the liquid used for the washing process can drain from the guard.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
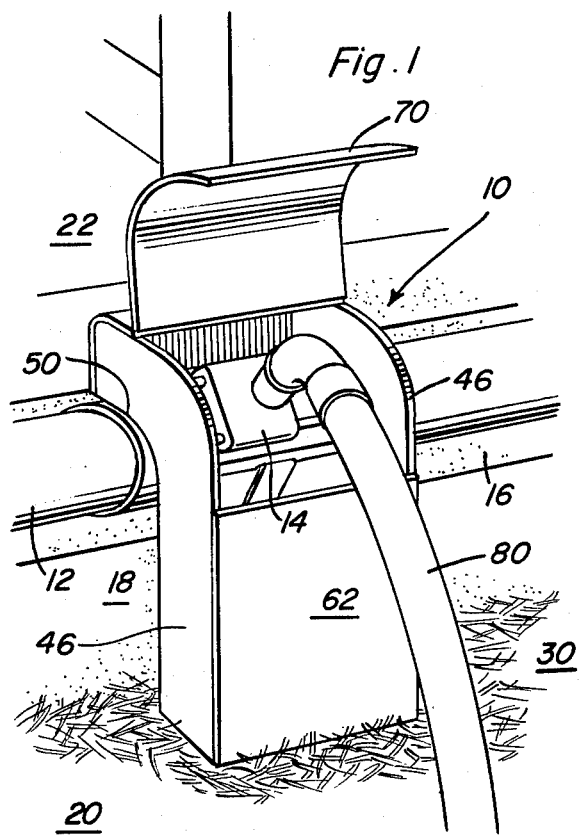
FIG. 1 is a perspective view of the milk valve cover guard with the hinged cover opened.
Figure 2:
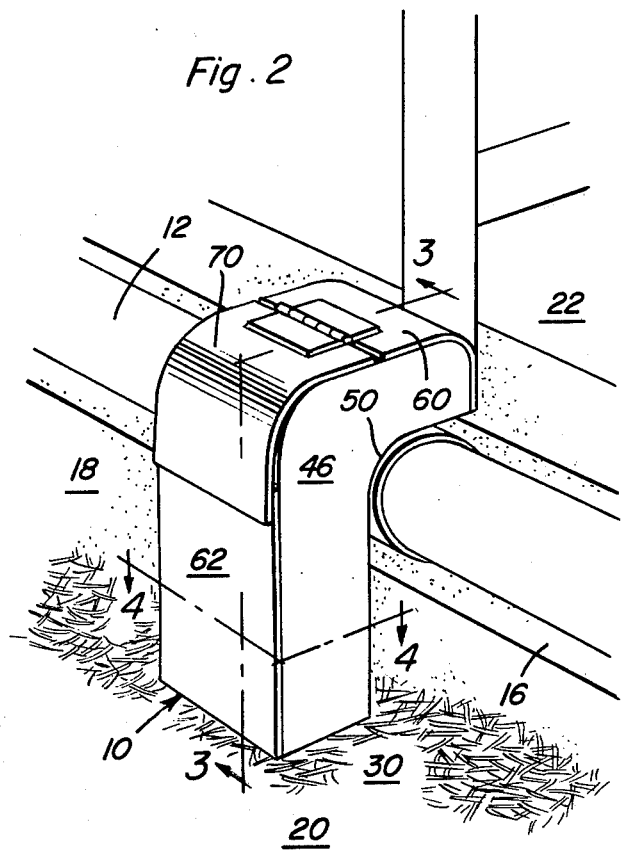
FIG. 2 is a perspective view of the milk valve cover guard with the hinged cover closed.
Figure 3:
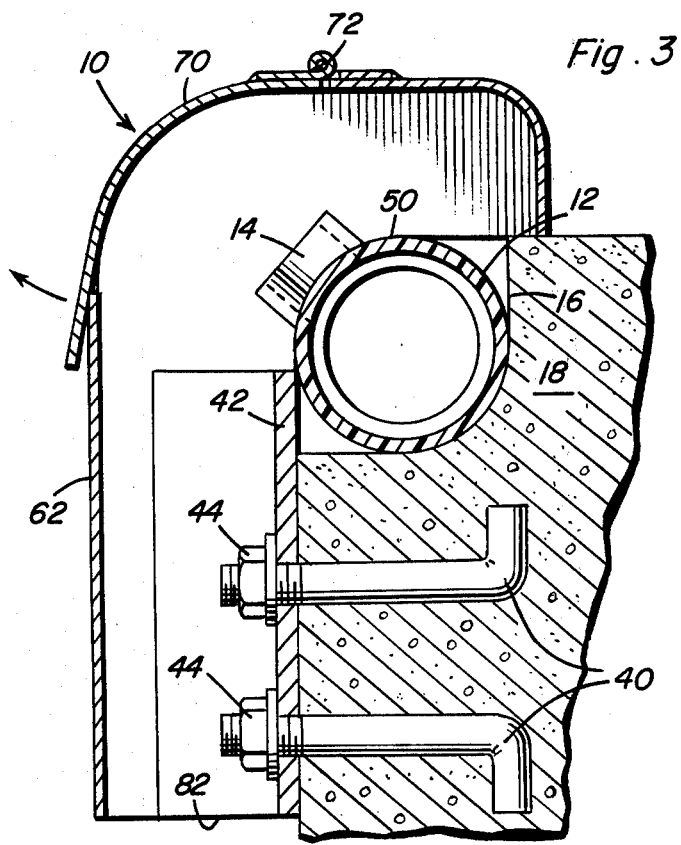
FIG. 3 is an elevational sectional view taken substantially along a plane passing through section line 3—3 of FIG. 2.
Figure 4:
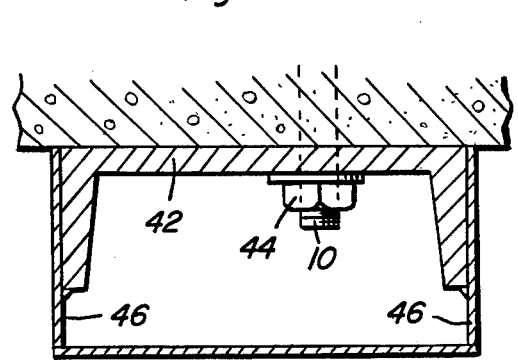
FIG. 4 is a top plan sectional view taken substantially along a plane passing through section line 4—4 of FIG. 2.

Now with reference to the drawings, a milk valve cover guard incorporating the principles and concepts of the present invention and generally referred to by the reference numeral 10 will be described in detail. It will be seen that the milk valve cover guard 10 is used on a milk line 12 to cover any known available milk valve 14. The milk line 12 is embedded in a recess 16 formed in concrete curb 18. Curb 18 forms a portion of the partition dividing stall area 20 from the manager area 22 of a tie stall barn. Accordingly, it is evident that the milk line 12, being a low line installation, is subject to direct contact with hay or straw in the stall area shown generally at 30 together with the feet and hoofs of cows which are kept in the stall. Also, feed and grain which is disposed in the manger area 22 can easily be dropped on the line during the feeding process. Accordingly, the guard 10 maintains a sufficient distance between debris and the valve 14 to keep the milk clean. By use of the guard, bacteria counts can be kept as low as 400 which is essentially sterile milk.

The guard is directly attached to curb 18 by two anchor bolts 40 which are embedded in the concrete of which the curb is poured. Of course, the anchor bolts 40 can be connected to an existing curb by any known procedure. The anchor bolts have threaded ends which extend out of the curb and through apertures formed in a mounting plate for the guard which comprises channel section 42. The apertures are formed in the bight of the channel section and nuts 44 are connected to hold the guard against the side of the curb. The channel section is positioned slightly above the floor of the stall area and rises to a height just below the position of valve 14. Attached to each leg of the channel section is a side panel 46. Side panels 46 are identical in shape and can be welded to the channel section or connected by any other available means. Each side panel 46 extends vertically alongside the associated leg of the channel section and then extends above the channel section bending to a horizontal position about radius 50 which should be equivalent approximately to the radius of curvature of the milk line 12. The panels then extend over the recess 16 and contact the upper horizontal surface of the curb 18. Foam sealant, rubberized tape, or the like, can be inserted between the inner edge of the side panels 46 and the curb and milk line in order to insure that a contamination resistant seal is made in that area. A first sheet metal plate or upper wall 60 is permanently attached to the rear and top edges of side panels 46. A front panel 62 is connected between the forward edges of the side panels and rises to a height slightly above that of the channel section 42. A hinged curved lid 70 is attached at pivot joint 72 to sheet metal 60. The lid 70 extends around the outer curvature of the side panels and overlaps front sheet metal piece 62.

Obviously, when in use, the lid 70 is opened and milk line 80 is connected to valve 14. When the valve 14 is not in use, the lid 70 is simply closed to protect the valve. When it is desired to clean the valve, the lid can be opened and the valve can be easily washed as with a hose. The lower portion comprising the channel section 42, front sheet metal 62 and the side panels 46 act as a chute and possess an open bottom 82 for discharging the cleaning water onto the floor of the stall. This enables the valve to be easily and effectively cleaned when it is necessary to do so.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a milking machine low line assembly including a curb mounting a milk line and a milk valve connected to said line, the improvement comprising; a milk valve cover guard connected to said curb in surrounding, spaced relation to said valve, said cover guard including a hinged lid section for disposition in an open position to allow access to said valve and a closed position to prevent access to said valve, said milk valve cover guard also including a depending chute area having an open bottom for discharging cleaning fluid dispensed at said valve, said cover guard further including a pair of curved side panels spaced one on each side of said milk valve and extending vertically along a portion of the side of said curb and horizontally along a portion of the top of said curb and further including a front panel extending between said side panels, said hinged lid section being connected between the horizontal portions of said side panels for pivotal movement between a closed position and an open position.

2. The combination as defined in claim 1 and further including a channel member connected between said side panels and having a pair of apertures formed therein for connection to said curb.

3. In combination with a curb defining an upwardly and outwardly opening recess therein extending along said curb and wherein a milk line is received within and extends along said recess and includes a milk valve, a milk valve cover guard including a pair of upstanding side panels spaced along said recess and aligned on opposite sides of said valve, said side panels being connected to said curb and including lower portions thereof extending upwardly along the side of the curb outwardly of which said recess opens and upper portions extending across the top of said curb, a front panel secured between the lower portions of said side panels outwardly of said curb and a hinged lid pivotally supported between the upper portions of said side panels for swinging movement between closed and open positions, closing and opening the upper portion of said cover guard for access to said valve from above, the lower portion of said cover guard opening downwardly between the lower portions of said side panels for discharging cleaning fluid dispensed at said valve.

4. The combination of claim 3 including an upper wall extending and secured between said upper portions of said side panels and disposed on the side of said hinged lid remote from said front panel.

* * * * *